Patented Oct. 16, 1934

1,976,750

UNITED STATES PATENT OFFICE 1,976,750

LAMINATED SAFETY GLASS

Joseph D. Ryan and George B. Watkins, Toledo, Ohio, assignors to Libbey-Owens-Ford Glass Company, Toledo, Ohio, a corporation of Ohio No Drawing. Application September 18, 1933, Serial No. 689,959

10 Claims. (Cl. 49—81)

The present invention relates to the art of laminated safety glass manufacture and more particularly to a process enabling the employment of ethyl cellulose plastic in the making of composited safety glass.

Laminated safety glass comprises two sheets of glass and an interposed transparent tough plastic material adherent to the inner surfaces of the glass sheets. Pyroxylin plastic and cellulose acetate plastic have been the two generally used plastics in the production of this type of glass. As a result of work done by us, we feel that suitably plasticized ethyl ethers of cellulose are more desirable as the central portion of laminated safety glass than either pyroxylin plastic or cellulose acetate. This may be due to the fact that the ethyl cellulose is more stable as the ethyl linkage indicates extremely good stability, especially when compared with the esters and particularly as regards hydrolysis. Further, the extreme resistance to acids and bases makes the use of ethyl cellulose favorable as does its stability toward light and heat energy. It has also been our experience that ethyl cellulose plastic offers a very desirable plastic to the laminated safety glass art in that it is more elastic than either cellulose acetate or pyroxylin plastic.

Probably one reason that ethyl cellulose plastic has not been used in the commercial production of laminated safety glass is the difficulty in bonding such plastic to glass surfaces. The present invention relates particularly to a bonding agent or adhesive, the process of producing the adhesive, and the process of using the adhesive in the making of commercial safety glass with ethyl cellulose plastic.

In our experimental work, we learned that the commonly known adhesives for bonding pyroxylin plastic to glass including gelatin, casein, numerous synthetic resins, solvents and solvent mixtures, etc. failed to give adhesion between the ethyl cellulose plastic and glass surfaces. We also found that bonding materials which can be successfully used in bonding cellulose acetate plastic and glass were of no use in the bonding of ethyl cellulose plastic and glass.

We then developed an adhesive using a low viscosity nitro-cellulose dope solution which gave reasonably satisfactory adhesion, but because of the instability of the resulting sheet toward light due, we believe, primarily to the presence of the nitro-cellulose, this adhesive was not considered satisfactory as a bonding adhesive for the ethyl cellulose plastic and glass. We then developed an adhesive which gives excellent results, broadly speaking, this adhesive consisting of a lacquer dope made from an oxidized product of cellulose ethyl ethers.

Such an adhesive can be made in the following manner: Unplasticized ethyl cellulose obtainable on the open market can be used, and in some cases the material purchased is dense and non-porous in character. For the purpose of producing a satisfactory adhesive, we found that the reaction process is unnecessarily prolonged if the dense non-porous unplasticized ethyl cellulose is used. To render the ethyl cellulose porous and fluffy, the dense, horny particles are dissolved in acetone and the resultant dope slowly poured with rapid stirring into a large volume of water. The mixture is then filtered and the porous mass on the filter washed with water and dried.

In accordance with our invention, the next step resides in the oxidation of the ethyl cellulose. We have determined that numerous oxidizing agents are suitable for producing the desired results. For example, bleaching powder, chlorine, bromine, dilute nitric acid, potassium chlorate and hydrochloric acid, chromic acid, sodium hydroxide and air, potassium or sodium dichromate and sulfuric acid, as well as potassium permanganate may be successfully employed. Naturally the reaction time, temperature and concentration of reactants are varied or are dependent upon the power of the oxidizing agent selected as well as the particular ethyl celulose to be oxidized.

By way of example, a specific description of the oxidation of ethyl cellulose using potassium permanganate is given. Ten grams of ethyl cellulose are suspended in a solution of 5 grams of potassium permanganate dissolved in 500 c. c. of water. The mixture can be heated by a steam bath until the purple permanganate color has been replaced by the brownish color characteristic of manganese dioxide. The time for reaction is usually a few hours. The mixture, after reaction, can be treated in several ways to recover the oxidized ethyl ether of cellulose. In one method of recovery, the reaction mass may be filtered, air dried, and extracted with a suitable solvent for the oxidized ethyl cellulose which is a non-solvent for manganese dioxide. In another method, the reaction mass can be treated with a reducing agent which will convert the manganese dioxide into a soluble manganous salt leaving the oxidized ethyl cellulose in suspension. This mixture can then be filtered, washed free of acid and salts, and air dried. While the method described involves the oxidation of the ethyl cellulose with potassium permanganate in neutral solution, we have found that equally as good results can be obtained when potassium permanganate is used in either alkaline or acid solution.

We have discovered that the oxidized ethyl cellulose is similar in solubility characteristics to ethyl cellulose itself. The next step in preparing the oxidized ethyl cellulose as an adhesive for the purpose stated is to dissolve it in a suitable solvent or mixtures of solvents so that it can be applied to the laminations to be bonded by any of the methods well known in the art. Excellent results are obtained when plasticizers for ethyl cellulose, such as the phthalate esters, are incorporated with the oxidized ethyl cellulose solution, although we have obtained good results in the bonding of ethyl cellulose plastic and glass with the oxidized ethyl cellulose solution even when the plasticizers are not included in the adhesive film.

If it is desired to spray the adhesive onto the laminations, the following mixture can be made: One part by weight of oxidized ethyl cellulose, 1 part by weight of dibutyl phthalate, with sufficient acetone being added to give good spraying consistency.

Should it be desired to apply the adhesive to the laminations by a coating process such as, for example, film applying rolls, the following mixture may be used with excellent results: Ten parts by weight of oxidized ethyl cellulose, 10 parts by weight of dibutyl phthalate, 23 parts by weight of carbitol (mono ethyl ether of diethylene glycol), 23 parts by weight of cellosolve acetate (acetate ester of mono ethyl ether of ethylene glycol), and 34 parts by weight of cellosolve (mono ethyl ether of ethylene glycol).

To produce laminated safety glass, the adhesive prepared in the above manner can be applied to one surface each of two sheets of glass which have been suitably cleaned and a sheet of ethyl cellulose plastic interposed between the two glass sheets coated with the adhesive, and the resultant sandwich subjected to heat and pressure, a suitable pressing cycle being 50 pounds per square inch at 300° F. for four minutes. Glass made by this process is characterized by excellent adhesion and stability.

The adhesive material produced by using the oxidized ethyl cellulose has been checked a number of times using different grades of ethyl cellulose bought on the open market, and in all cases we have obtained excellent adhesion.

We have already pointed out that ethyl cellulose plastic cannot be bonded to glass with pyroxylin plastic and cellulose acetate bonding agents, and we have also found that apparently the ethyl cellulose adhesive made in accordance with the present invention does not give satisfactory results as an adhesive between pyroxylin plastic and glass or cellulose acetate and glass.

It will thus be seen that broadly our invention contemplates the use of an adhesive for ethyl cellulose plastic and glass made by oxidizing unplasticized ethyl cellulose and then dispersing the unoxidized ethyl cellulose in suitable solvents and, if desired, plasticizers, so that the resulting solution can be applied to the laminations, after which the laminations can be permanently bonded together by the application of heat and pressure. Safety glass made in this way possesses remarkable adhesion and is decidedly stable to heat and light energy so that the glass will give satisfactory results when subjected to the normal and varying climatic conditions ordinarily encountered in the commercial field.

The expression "oxidized ethyl cellulose" has been used in connection with the taking of unplasticized ethyl cellulose and oxidizing the same. However, we wish it to be understood that we also have in mind the oxidizing of cellulose to oxycellulose and then etherifying the oxycellulose, resulting in ethyl oxycellulose, then dispersing this in solvents and plasticizers and applying it to the laminations in the manner above described.

We claim:

1. Laminated safety glass comprising two sheets of glass and an interposed layer of ethyl cellulose plastic bonded to the glass by ethyl oxycellulose.

2. Laminated safety glass comprising two sheets of glass and an interposed layer of ethyl cellulose plastic bonded to the glass by oxidized ethyl cellulose.

3. Laminated safety glass comprising two sheets of glass and an interposed layer of ethyl cellulose plastic bonded to the glass by oxidized ethyl cellulose and a plasticizer for ethyl cellulose plastic.

4. Laminated safety glass comprising two sheets of glass and an interposed layer of ethyl cellulose plastic bonded to the glass by an adhesive made from oxidized unplasticized ethyl cellulose.

5. Laminated safety glass comprising two sheets of glass and an interposed layer of ethyl cellulose plastic bonded to the glass by an adhesive made from oxidized unplasticized ethyl cellulose and a plasticizer for ethyl cellulose plastic.

6. Laminated safety glass comprising two sheets of glass and an interposed layer of ethyl cellulose plastic bonded to the glass by an adhesive made from oxidized unplasticized ethyl cellulose and an ester of phthalic acid.

7. The process of producing laminated safety glass comprising two sheets of glass and an interposed layer of transparent ethyl cellulose plastic consisting in oxidizing ethyl cellulose, dispersing the same in a solvent, then applying the solution so formed to the glass sheets, arranging a sheet of ethyl cellulose plastic between two coated glass sheets, and subjecting the assembly thus formed to heat and pressure.

8. The process of producing laminated safety glass comprising two sheets of glass and an interposed layer of transparent ethyl cellulose plastic consisting in oxidizing unplasticized ethyl cellulose, dispersing the same in a solvent, then applying the solution so formed to the glass sheets, arranging a sheet of ethyl cellulose plastic between two coated glass sheets, and subjecting the assembly thus formed to heat and pressure.

9. The process of producing laminated safety glass comprising two sheets of glass and an interposed layer of transparent ethyl cellulose plastic consisting in oxidizing ethyl cellulose, dispersing the same in a plasticizer for ethyl cellulose, then applying the solution so formed to the glass sheets, arranging a sheet of ethyl cellulose plastic between two coated glass sheets, and subjecting the assembly thus formed to heat and pressure.

10. The process of producing laminated safety glass comprising two sheets of glass and an interposed layer of transparent ethyl cellulose plastic consisting in oxidizing unplasticized ethyl cellulose, dispersing the same in a plasticizer for ethyl cellulose, then applying the solution so formed to the glass sheets, arranging a sheet of ethyl cellulose plastic between two coated glass sheets, and subjecting the assembly thus formed to heat and pressure.

JOSEPH D. RYAN.
GEORGE B. WATKINS.